(12) United States Patent
Miyanabe et al.

(10) Patent No.: US 12,529,081 B2
(45) Date of Patent: Jan. 20, 2026

(54) COMPOSITION FOR PRODUCING CERAMIDE

(71) Applicant: GENUINE R&D CO., LTD., Fukuoka (JP)

(72) Inventors: Masakatsu Miyanabe, Fukuoka (JP); Shinobu Hiraki, Fukuoka (JP); Xiaolin Luo, Fukuoka (JP); Hiroyuki Imai, Hyogo (JP)

(73) Assignee: GENUINE R&D CO., LTD., Fukuoka (JP)

( * ) Notice: Subject to any disclaimer, the term of this patent is extended or adjusted under 35 U.S.C. 154(b) by 713 days.

(21) Appl. No.: 17/789,058

(22) PCT Filed: Dec. 7, 2020

(86) PCT No.: PCT/JP2020/045377
§ 371 (c)(1),
(2) Date: Sep. 30, 2022

(87) PCT Pub. No.: WO2021/131627
PCT Pub. Date: Jul. 1, 2021

(65) Prior Publication Data
US 2023/0094080 A1     Mar. 30, 2023

(30) Foreign Application Priority Data

Dec. 26, 2019   (JP) ................................. 2019-236101

(51) Int. Cl.
| | | |
|---|---|---|
| *C12P 13/02* | (2006.01) | |
| *A61K 8/68* | (2006.01) | |
| *A61Q 19/00* | (2006.01) | |
| *C11B 11/00* | (2006.01) | |
| *C12P 19/00* | (2006.01) | |

(52) U.S. Cl.
CPC ............... *C12P 13/02* (2013.01); *A61K 8/68* (2013.01); *A61Q 19/00* (2013.01); *C11B 11/00* (2013.01); *C12P 19/00* (2013.01)

(58) Field of Classification Search
CPC ......... A23L 31/00; A23L 33/105; A61K 8/68; A61K 2800/10; A61Q 19/00; C11B 11/00; C12N 9/14; C12P 13/02; C12P 19/00
See application file for complete search history.

(56) References Cited

FOREIGN PATENT DOCUMENTS

| | | |
|---|---|---|
| JP | 2017-195855 A | 11/2017 |
| WO | WO 99/63105 A1 | 12/1999 |

OTHER PUBLICATIONS

Yazawa et al. "A new method for the preparation of a purified glucosylceramide and ceramide from shiitake mushroom", Bioscience, Biotechnology and Biochemistry, 2022, vol. 86, No. 12, pp. 1680-1687. (Year: 2022).*

Castro et al. "Ceramide: A simple sphingolipid with unique biophysical properties", Progress in Lipid Research, 2014, vol. 54, pp. 53-67. (Year: 2014).*

Ishibash, Y. et al., A novel glucosylceramide-degrading enzyme found in pathogenic fungi, Presentation abstracts of the 82nd Annual Meeting of the Japanese Biochemical Society, 2009, p. 1, 4P-061 (see International Search Report below for concise statement of relevance).

Feb. 16, 2021, International Search Report issued for PCT application No. PCT/JP2020/045377.

Furuya, H. et al., Isolation of a novel bacterium, *Blautia glucerasei* sp. nov., hydrolyzing plant glucosylceramide to ceramide, Archives of Microbiology, 2010, vol. 192, pp. 365-372.

Itonori, S. et al., Glycosphingolipids in Edible Fungi and Their Biological Activities, Foods and Food Ingredients Journal of Japan, 2004, vol. 209, No. 3, pp. 211-218.

Imai et al., Structural diversity and metabolic pathway analysis of plant sphingolipids, Journal of Biochemistry, 2016, vol. 88, pp. 94-104.

Ishibashi et al., Quality Control of Fungus-specific Glucosylceramide in Cryptococcus neoformans by Endoglycoceramidase-related Protein 1 (EGCrP1), The Journal of Biological Chemistry, Jan. 2, 2012, pp. 368-381, vol. 287, No. 1.

Takahashi et al., Current relevance of fungal and trypanosomatid glycolipids and sphingolipids: studies defining structures conspicuously absent in mammals, Annals of the Brazilian Academy of Sciences, 2009, pp. 477-488, vol. 81, Issue 3.

Sperling et al., Plant sphingolipids: structural diversity, biosynthesis, first genes and functions, Biochimica et Biophysica Acta (BBA)—Molecular and Cell Biology of Lipids, 2003, pp. 1-15, vol. 1632, Issue 1-3.

Mar. 21, 2023, Taiwanese Office Action issued for related TW Application No. 109143925.

Richard Jennemann et al., Novel glycoinositolphosphosphingolipids, basidiolipids, from Agaricus, European Journal of Biochemistry, 1999, pp. 331-338.

Richard Jennemann et al., Glycoinositolphosphosphingolipids (basidiolipids) of higher mushrooms, European Journal of Biochemistry, 2001, pp. 1190-1205.

(Continued)

*Primary Examiner* — Louise W Humphrey
*Assistant Examiner* — Deepa Mishra
(74) *Attorney, Agent, or Firm* — Paratus Law Group, PLLC

(57) ABSTRACT

Provided is a means for preparing a free ceramide (Cer) from a glycosyl inositol phospho ceramide (GIPC). Specifically provided is a composition for digesting a glycosyl inositol phospho ceramide (GIPC) or a glucosylceramide for producing a free ceramide, the composition comprising a mushroom self-digestion liquid or purified product thereof.

6 Claims, 2 Drawing Sheets

(56) References Cited

OTHER PUBLICATIONS

Jae-Hoon Choi et al., Novel Cerebroside, Termitomycesphin I, from the Mushroom, *Termitomyces titanicus*, 2012, pp. 1407-1409, vol. 76, No. 7.
Tatsuya Sugawara et al., Analysis of Glucosylceramides from Various Sources by Liquid Chromatography-Ion Trap Mass Spectrometry, Journal of Oleo Science, 2010, pp. 387-394, vol. 59, No. 7.

* cited by examiner

COMPOSITION FOR PRODUCING CERAMIDE

CROSS REFERENCE TO PRIOR APPLICATION

This application is a National Stage Entry of PCT International Patent Application No. PCT/JP2020/045377 (filed on Dec. 7, 2020) under 35 U.S.C. § 371, which claims priority to Japanese Patent Application No. 2019-236101 (filed on Dec. 26, 2019).

TECHNICAL FIELD

The present disclosure relates to a composition for producing ceramides, a method for preparing ceramides using the composition, and the like. The contents of all of the references described in this specification are incorporated by reference.

BACKGROUND ART

Ceramides, which are the main component of human epidermal intercellular lipids, have expanded their market as, for example, functional cosmetic materials. The stratum corneum ceramide level is known to gradually decrease with aging. Supplementation of external ceramides is thus considered to be important for maintaining healthy skin. Since ceramides present as stratum corneum intercellular lipids are free ceramides, attention is also focused on free ceramides.

For this reason, demand for free ceramides has increased, and a method for efficiently preparing free ceramides is desired. Additionally, consumers have come to prefer plant-derived ingredients with increased interest in health, and therefore, plant-derived free ceramides are particularly in high demand. In particular, a method for efficiently preparing plant-derived free ceramides is desired.

A comprehensive analysis of plant sphingolipids shows that glycosyl inositol phospho ceramides (GIPCs) and glucosylceramides (GlcCers) account for almost 90% of all plant sphingolipids (Non-patent Literature 1). Glucosylceramides are digested by β-glucosylceramidase into ceramides (free ceramides: Cer); however, a method for producing free ceramides from glycosyl inositol phospho ceramides has not been founded yet. If a method for preparing free ceramides from glycosyl inositol phospho ceramides could be found, efficient preparation of free ceramides would be possible.

CITATION LIST

Non-Patent Literature

NPL 1. Hiroyuki IMAI et al., Journal of Japanese Biochemical Society, 88.1 (2016): 94-104.

SUMMARY OF INVENTION

Technical Problem

The present inventors conducted examination in order to provide a method for preparing a free ceramide (Cer) from a glycosyl inositol phosphor ceramide (GIPC).

Solution to Problem

The present inventors have found the possibility that a mushroom self-digestion liquid can digest a glycosyl inositol phospho ceramide (GIPC) to produce a free ceramide. Further, the inventors have surprisingly found the possibility that the mushroom self-digestion liquid can also digest a glucosylceramide to produce a free ceramide, and they conducted further improvements.

This disclosure includes the subject matter described in the following items.

Item 1

A composition for digesting a glycosyl inositol phospho ceramide (GIPC) or glucosylceramide for producing a free ceramide, the composition comprising a mushroom self-digestion liquid or purified product thereof.

Item 2

The composition according to Item 1, wherein the glycosyl inositol phospho ceramide is a plant-derived glycosyl inositol phospho ceramide.

Item 3

The composition according to Item 1 or 2, wherein the glycosyl inositol phospho ceramide is represented by formula (1):

wherein GlcA represents a glucuronic acid, Ins-P-Cer represents a inositol phospho ceramide, and R represents a monosaccharide or disaccharide.

Item 4

An enzyme according to Item 3, wherein the glycosyl inositol phospho ceramide represented by formula (1) is at least one member selected from the group consisting of the following H-GIPC, N-GIPC, NAc-GIPC, HN-GIPC, and HNAc-GIPC:

[Chem. 1]

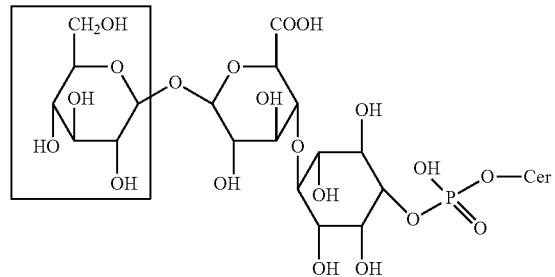

(H-GIPC: with the proviso that a glucose residue surrounded by a square frame may be a mannose residue or a galactose residue.)

[Chem. 2]

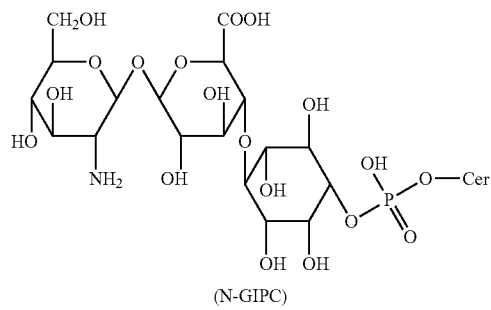

(N-GIPC)

-continued

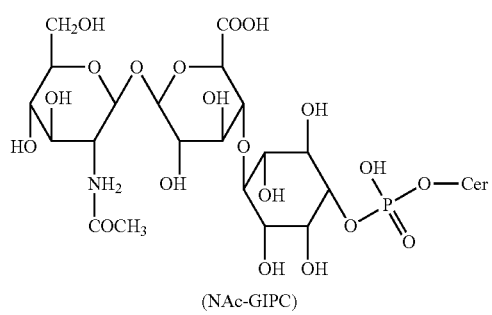

(NAc-GIPC)

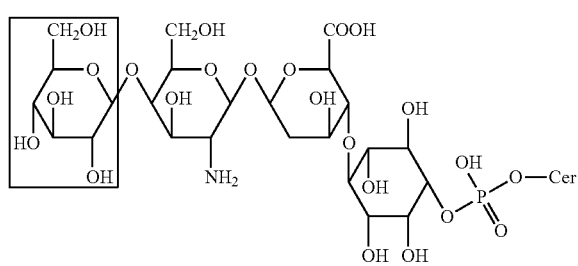

(HN-GIPC: with the proviso that a glucose residue surrounded by a square frame may be a mannose residue or a galactose residue.)

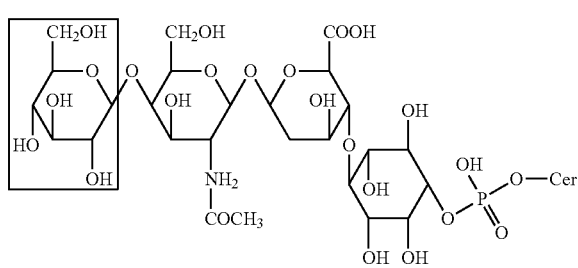

(HNAc-GIPC: with the proviso that a glucose residue surrounded by a square frame may be a mannose residue or a galactose residue.)

Item 5

The composition according to any one of Items 1 to 4, wherein the ceramide skeleton of the glycosyl inositol phospho ceramide or glucosylceramide is a combination of a sphingoid base containing 2 or 3 hydroxyl groups, 18 or 20 carbons atoms, and 0, 1, or 2 carbon-carbon double bonds and a fatty acid containing 12 to 26 carbon atoms, 0 or 1 carbon-carbon double bond, and 0, 1, or 2 hydroxyl groups.

Item 6

A composition for digesting a glucosylceramide for producing a free ceramide, the composition comprising a mushroom self-digestion liquid or purified product thereof.

Item 7

The composition according to any one of Items 1 to 6, wherein the mushroom self-digestion liquid is a self-digestion liquid of at least one mushroom selected from the group consisting of enokitake (*Flammulina velutipes*), shimeji (*Lyophyllum shimeji*), eringi (*Pleurotus eryngii*), and shiitake (*Lentinula edodes*).

Item 8

A method for producing a free ceramide, comprising reacting a mushroom self-digestion liquid or purified product thereof with a glycosyl inositol phospho ceramide (GIPC) or glucosylceramide.

Item 9

A method for producing a free ceramide, comprising reacting the composition according to any of Items 1 to 7 with a glycosyl inositol phospho ceramide (GIPC) or glucosylceramide.

Advantageous Effects of Invention

The present invention provides a method that is capable of producing a free ceramide from a glycosyl inositol phospho ceramide (GIPC). The present invention also provides a method that is capable of producing a free ceramide from a glucosylceramide.

DESCRIPTION OF EMBODIMENTS

Figure 1:
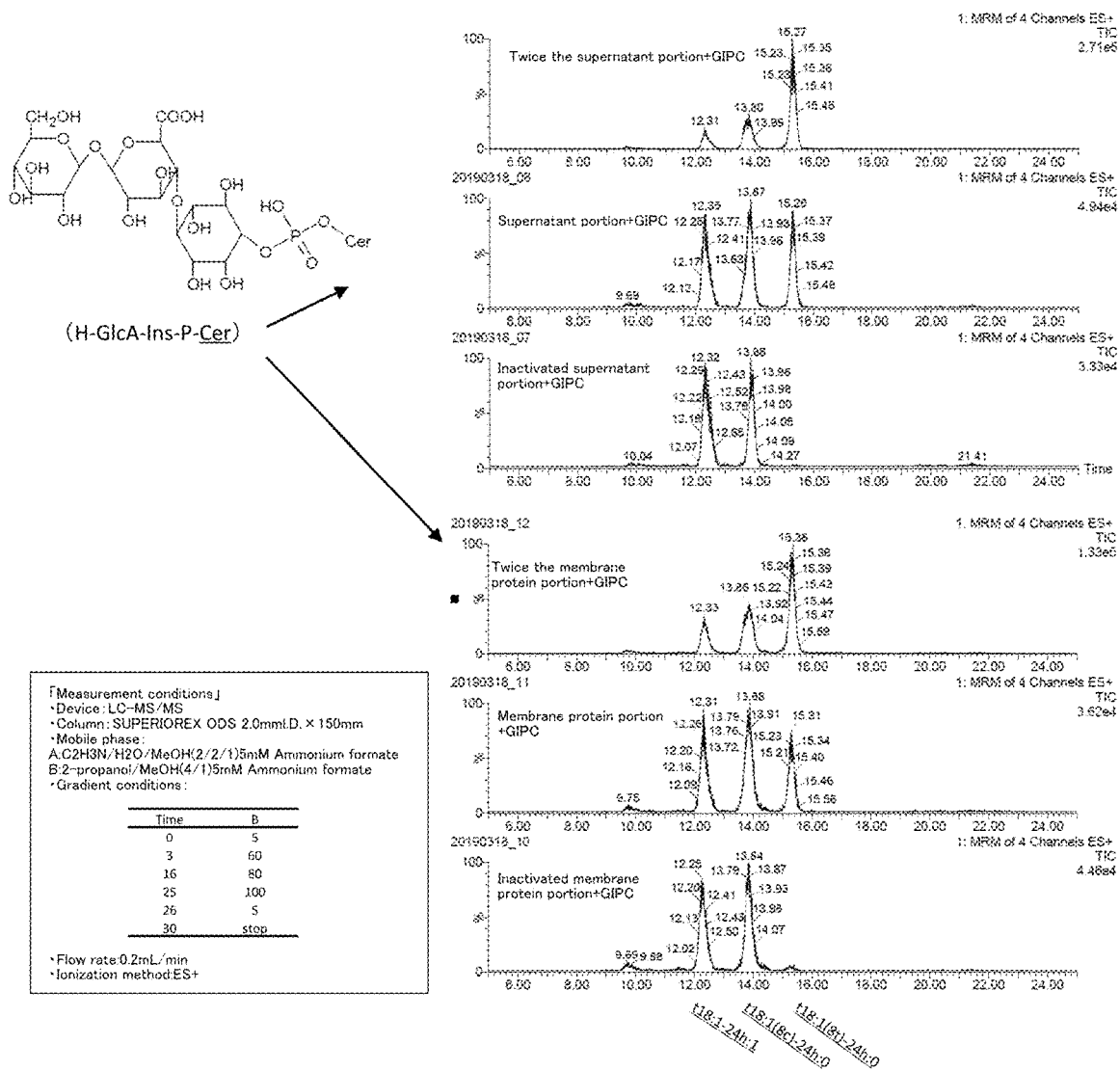
FIG. 1 shows the results of the detection of free ceramides produced when plant-derived GIPCs are treated with an enoki digestion liquid (supernatant portion or membrane protein portion).

Embodiments encompassed by the present disclosure are explained in more detail below. This disclosure preferably encompasses, but is not limited to, a composition for digesting a glycosyl inositol phospho ceramide (GIPC) or glucosylceramide (GlcCer) for producing a free ceramide, and a method for preparing a free ceramide using the composition. The present disclosure encompasses all that is described in the present specification and could be recognized by those skilled in the art. In this specification, a glycosyl inositol phospho ceramide, glucosylceramide, free ceramide, and sphingoid base constituting a ceramide are sometimes referred to as "GIPC," "GlcCer," "Cer," and "LCB," respectively.

The composition for digesting GIPCs or GlcCers encompassed by the present disclosure contains a mushroom self-digestion liquid or purified product thereof. The mushroom self-digestion liquid itself or a purified product itself may be used (in other words, the composition may consist of a mushroom self-digestion liquid or purified product thereof), or the composition may additionally contain one or more other components. As the one or more other components, a component that does not suppress the enzyme reaction is preferred, and examples include water. The composition for digesting GIPCs or GlcCers encompassed by the present disclosure is sometimes referred to as the "composition for digestion of the present disclosure." The composition for digestion of the present disclosure can be used as a composition for digesting GIPCs, GlcCers, or GIPCs and GlcCers.

Self-digestion means the destruction of tissues by their own enzymes when organisms are in danger of death. (It can be said that the self-digestion is a reaction to survive by producing nutrients or defensive components even if the organisms break themselves down.) In this specification, the mushroom self-digestion liquid is a composition obtained by the self-digestion of a mushroom. For example, the mushroom self-digestion liquid can be a liquid composition, which may contain a substance that is not digested. For example, the mushroom self-digestion liquid can be obtained by holding or shaking a mushroom at an appropriate temperature (e.g., 15 to 37° C., preferably about 25° C.) for 1 to 48 hours. Performing homogenization before or after holding is preferred, and performing homogenization after holding is particularly preferred.

The mushroom self-digestion liquid may be used as a composition for digesting GIPCs or GlcCers without any treatment, or it may be purified. The purification method is not particularly limited, and a known method can be used. For example, the mushroom self-digestion liquid may be centrifuged to separate it into a supernatant and a precipitate (pellet), and the supernatant or pellet may be used as a composition for digesting GIPCs or GlcCers. Alternatively, water or a pH adjuster is suitably added to the mushroom self-digestion liquid or purified product thereof, and the mixture may be used as a composition for digesting GIPCs or GlcCers.

Examples of mushrooms include enokitake (*Flammulina velutipes*), shimeji (*Lyophyllum shimeji*), eringi (*Pleurotus eryngii*), shiitake (*Lentinula edodes*), matsutake (*Tricholoma matsutake*), maitake (*Grifola frondosa*), hiratake (*Pleurotus ostreatus*), nameko (*Pholiota microspora*), mushrooms, and porcini mushrooms. Of these, enokitake, *shimeji*, eringi, and shiitake are particularly preferred. The mushrooms can be used alone or in a combination of two or more.

As GIPCs, those derived from animals, plants, and fungi can be all used. Plant-derived GIPCs are particularly preferred.

A GIPC has a structure in which a saccharide is attached to an inositol phospho ceramide (Ins-P-Cer). The GIPC used in the present invention is preferably a glycosyl inositol phospho ceramide represented by formula (1):

(1)

wherein GlcA represents a glucuronic acid, Ins-P-Cer represents an inositol phospho ceramide, and R represents a monosaccharide or disaccharide. Of the glycosyl inositol phospho ceramides, H-GIPC, N-GIPC, NAc-GIPC, HN-GIPC, and HNAc-GIPC are preferred. H-GIPC is particularly preferred. The glycosyl inositol phospho ceramides can be used alone or in a combination of two or more. The structures of various glycosyl inositol phospho ceramides are shown below (cited from Non-patent Literature 1).

[Chem. 6]

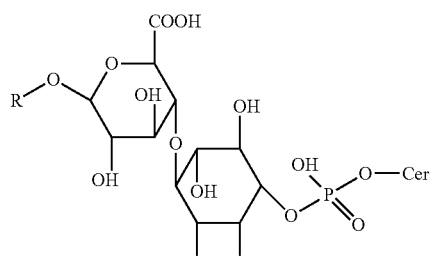

Core structure of plant GIPC
(GIPC R-GlcA-Ins-P-Cer)

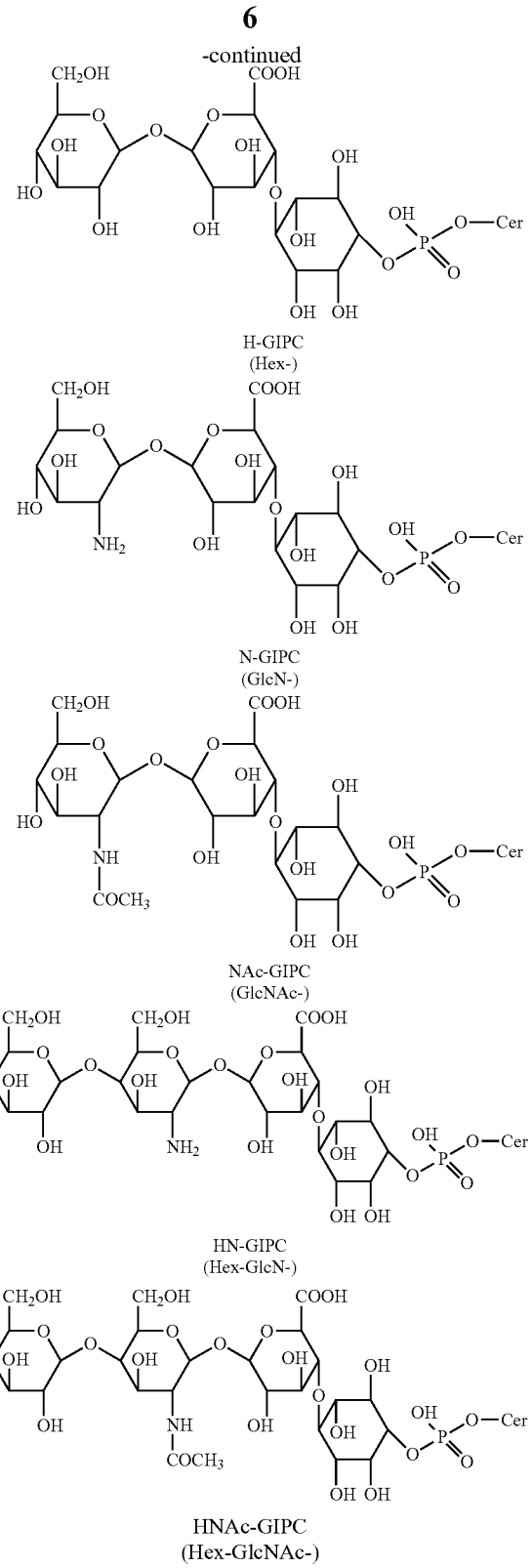

In the structural formula of H-GIPC above, R in formula (1) represents a glucose residue; however, this is an example, and there is no limitation as long as R is a hexose residue. For example, R may be a mannose residue or galactose residue rather than a glucose residue. Specifically, H-GIPC represents hexose residue-GlcA-Ins-P-Cer, and preferable examples include glucose residue-GlcA-Ins-P-Cer, mannose residue-GlcA-Ins-P-Cer, and galactose residue-GlcA-Ins-P-Cer. The same applies to HN-GIPC and HNAc-PIPC. Specifically, the glucose residue described at the end opposite to the ceramide in the structural formulae of HN-GIPC and HNAc-PIPC is an example, and any hexose residues can be used. For example, a mannose residue or galactose residue rather than a glucose residue can be used.

A GlcCer has a structure in which a ceramide is attached to a glucose. As GlcCers, those derived from animals, plants, and fungi can be all used. Plant-derived GIPCs are particularly preferred.

By the composition for digesting GIPCs or GlcCers of the present disclosure, GIPCs or GlcCers are digested to excise the ceramide (Cer) portion, thus producing free ceramides.

A free ceramide is a compound having a structure (—NH—CO—) in which the carboxyl group (—COOH) of a fatty acid is attached to the amino group (—NH$_2$) of a sphingoid base.

Free ceramides produced from GIPCs or GlcCers by using the composition for digestion of the present disclosure are not particularly limited, and are preferably those described below.

The sphingoid base constituting the free ceramide preferably has 2 or 3 hydroxyl groups, and more preferably 3 hydroxyl groups. Further, the sphingoid base preferably has 14 to 22 (14, 15, 16, 17, 18, 19, 20, 21, or 22) carbon atoms, more preferably 16 to 20 carbon atoms, and even more preferably 18 or 20 carbon atoms. The sphingoid base also preferably has 0 or 1 carbon-carbon double bond. More specific examples of preferable sphingoid bases include sphingosine, dihydrosphingosine, phytosphingosine, and the like. Of these, phytosphingosine is particularly preferable.

The fatty acid constituting the free ceramide preferably has 12 or more carbon atoms, more preferably 12 to 26 (12, 13, 14, 15, 16, 17, 18, 19, 20, 21, 22, 23, 24, 25, or 26) carbon atoms, and even more preferably 16 to 26 carbon atoms. The fatty acid also preferably has 0 or 1 carbon-carbon double bond, and more preferably 0 carbon-carbon double bonds (i.e., a saturated fatty acid). The fatty acid also preferably has 0, 1, or 2 hydroxyl groups, and more preferably 1 or 2 hydroxyl groups. Although there is no particular limitation, when the fatty acid contains hydroxyl, the hydroxyl is preferably a-hydroxyl.

The combination of the sphingoid base: LCB and the fatty acid in the ceramide skeleton of the free ceramide may be any combination of sphingoid bases and fatty acids described above. Of these, a preferable example of the combination is a combination of a sphingoid base containing 2 or 3 (in particular, 3) hydroxyl groups and a fatty acid that does not contain or contains hydroxyl (particularly preferably a-hydroxyl when it contains hydroxyl). When the fatty acid contains hydroxyl, the number of hydroxyl groups is preferably 1 or 2.

Preferable examples include ceramide AP, which is a combination of phytosphingosine (P) and a fatty acid containing 1 hydroxyl group (preferably a-hydroxyl group) (A); ceramide NP, which is a combination of phytosphingosine (P) and a fatty acid containing 0 hydroxyl groups (N); and the like. Further, ceramide DP, which is a combination of phytosphingosine (P) and a fatty acid containing 2 hydroxyl groups (D), is also a preferable example. "Ceramide AP" and "ceramide NP" are terms commonly used in the art; however, "ceramide DP" is a term that is used in the present specification, and is not a commonly used team. Specific examples of ceramide DP include dihydroxylignoceroyl phytosphingosine and the like.

Free ceramides with a ceramide skeleton that is a combination of a sphingoid base containing 2 or 3 hydroxyl groups, 18 or 20 carbon atoms, and 0, 1, or 2 carbon-carbon double bonds; and a fatty acid containing 12 to 26, preferably 22, 23, 24, 25, or 26 carbon atoms), 0 or 1 carbon-carbon double bond, and 0, 1, or 2 hydroxyl groups are preferred. Of these, specific examples of preferable free ceramides include t18:0-22:0h, t18:1-22:0h, t18:0-23:0h, t18:1-23:0h, t18:0-24:0h, t18:1-24:0h, t20:0-24:0h, t18:1-26:0h, t18:0-25:0h, t18:0-24:0h2, and the like; and t18:0-23:1h, t18:1-23:1h, t18:0-24:1h, t18:1-24:1h, t20:0-24:1h, t18:1-26:1h, t18:0-25:1h, t18:0-24:1h2, and the like.

Alternatively, d18:0-12:0 is also preferred.

This notation is explained using "t18:0-22:0h" as an example. The first half ("t18:0") is information about the sphingoid base, and indicates a sphingoid base that contains 3 hydroxyl groups ("t") ("d" indicates two hydroxyl groups), 18 carbon atoms, and 0 carbon-carbon double bonds (i.e., containing no carbon-carbon double bonds). The latter half ("22:0h") is information about the fatty acid, and indicates a fatty acid that contains 22 carbon atoms, 0 carbon-carbon double bonds, and 1 hydroxyl group ("h"). "h2" indicates that the fatty acid contains 2 hydroxyl groups. The first half of the notation sometimes includes, after "t18:1," a number in subscript (or in brackets), which indicates at what carbon number the double bond is present. Additionally, the notation sometimes includes "c" or "t" after "t18:1" to indicate whether the isomer due to the carbon-carbon double bond is cis(c) or trans(t). For example, "t18:1$_c$" indicates the cis-isomer, and "t18:1$_{8t}$" indicates the trans-isomer in which the double bond is present on the eighth carbon. For the description of the latter half, the position of the number of hydroxyl groups and the number of carbon-carbon double bonds may be reversed, e.g., "22h:0" instead of "22:0h." A colon may be placed between these two numbers.

The free ceramides produced by the composition for digestion of the present disclosure may be used alone or in a combination (composition) of two or more.

The above description of free ceramides to be produced by the composition for digestion of the present disclosure can also be used as is as an explanation of the ceramide skeleton of GIPCs or GlcCers digested by the composition for digestion of the present disclosure. Specifically, GIPCs or GlcCers digested by the composition for digestion of the present disclosure are not particularly limited, but their ceramide skeleton moiety is preferably a skeleton that is explained in the free ceramide section.

The present disclosure also encompasses a method for producing a free ceramide, comprising reacting a mushroom self-digestion liquid or a purified product thereof with a GIPC or GlcCer. The mushroom self-digestion liquid or purified product thereof, and GIPC or GlcCer can be preferably used in the method. The method of reaction is not particularly limited, and a method comprising mixing the mushroom self-digestion liquid or purified product thereof with a GIPC or GlcCer, and allowing the mixture to stand or shaking the mixture at an appropriate temperature (e.g., 15 to 40° C.) for about 1 to 24 hours.

In the present specification, the term "comprising" includes consisting essentially of and consisting of. The present invention covers all combinations of the elements described in the present specification.

In addition, the various characteristics (properties, structures, functions, etc.) described in each embodiment of the present disclosure described above may be combined in any way in specifying the subject matter included in the present disclosure. In other words, the present invention includes all the subject matter comprising all combinations of the combinable characteristics described in the present specification.

EXAMPLES

The embodiments of the present disclosure are described in detail below by means of Examples; however, the embodiments of the present disclosure are not limited to these Examples.

Preparation of Enoki Digestion Liquid

Enokitake (also referred to as "enoki") was frozen overnight, and then self-digested as is in a thermostatic chamber at 25° C. 24 to 27 hours later, homogenization was performed in a food processor with or without EDTA. Each of the homogenates was subjected to solid-liquid separation, and the liquid portion was collected as an enoki digestion liquid. The collected enoki digestion liquid was centrifuged in an ultracentrifuge (Optima L-100XP, Beckman Coulter Inc.) at 32000 rpm for 1 hour at 4° C. to collect a liquid portion as a supernatant portion. The pellet portion was washed by adding 1.5 mL of MillQ, followed by centrifugation at 16000 rpm at 0° C. The pellet was collected as a membrane protein portion.

Table 1 shows the results obtained by quantifying proteins in the supernatant portion of the enoki digestion liquid according to the Bradford method, and the results obtained by quantifying proteins in the film protein portion according to the BCA method. Sample No. 2 and sample No. 3 respectively show a sample of the supernatant portion of the enoki digestion liquid and a sample of the membrane protein portion of the enoki digestion liquid. These results indicate that the addition of EDTA enhances the stability of enzyme-containing proteins.

TABLE 1

| No. | PH | Ultracentrifugation | Total proteins (mg/mL or in buffer) |
|---|---|---|---|
| 2 | 5.23 | Supernatant portion | 0.89 |
|  |  | Membrane protein portion | 1.68 |
| 3 | 6.48 | Supernatant portion | 1.9 |
|  |  | Membrane protein portion | 4.5 |

Digestion of GIPCs by Enoki Digestion Liquid

GIPCs isolated from a plant were used for examination. The GIPCs have a simple structure and are the molecular species of inositol phosphate-glucuronic acid-hexose (H-GlcA-Ins-P-Cer). The GIPCs were used as a reaction substrate, and reacted with the supernatant portion or membrane protein portion of the enoki digestion liquid at a pH of 5.0 and 37° C. for 1 hour. The reaction was also performed using the supernatant portion or membrane protein portion of an enoki digestion liquid that had been subjected to inactivation treatment at 100° C. for 5 minutes, and the resultants were used as a negative control.

In the used plant-derived GIPCs, most of the LCB moiety is an 8-unsaturated LCB of 8-trans configuration, and most of the fatty acid moiety is a 2-hydroxy fatty acid with 24 carbon atoms. In the GIPCs of enoki, most of the LCB moiety is a saturated LCB with 18 carbon atoms, and most of the fatty acid moiety is a 2-hydroxy fatty acid with 24 carbon atoms.

FIG. 1 shows the results in which the treatment solutions were subjected to an LC-MS/MS analysis by setting t18:1-24h:0 or t18:0-24:0 as product ions. The chemical structure figure on the left shows the main molecular species (H-GlcA-Ins-P-Cer) of used plant-derived GIPCs, while the graphs on the right show the total ion chromatogram for each treatment solution. In all of the treatment solutions without using the inactivated supernatant portion or inactivated membrane protein portion, three peaks were detected, and the three peaks were considered to be, from the left, enoki-derived t18:1-24h:1, enoki-derived t18:1(8c)-24h:0, and substrate (plant)-derived t18:1(8t)-24h:0. The substrate-derived t18:1(8t)-24h:0 tended to increase in the supernatant portion or membrane protein portion of the enoki digestion liquid in an enoki digestion liquid amount-dependent manner, and it was not detected in the treatment solution using the inactivated supernatant portion or inactivated membrane protein portion. The above indicates that the supernatant portion or membrane protein portion of the enoki digestion liquid had an effect of digesting the plant-derived GIPCs of the substrate to produce free ceramides, as well as the effect of self-digesting enoki GIPCs to produce free ceramides. It was also assumed that these effects were caused by enzymes contained in the enoki digestion liquid.

Digestion of GlcCers by Enoki Digestion Liquid

Examination was conducted to confirm whether the obtained enoki digestion liquid can produce free ceramides from a compound other than GIPCs.

Figure 2:
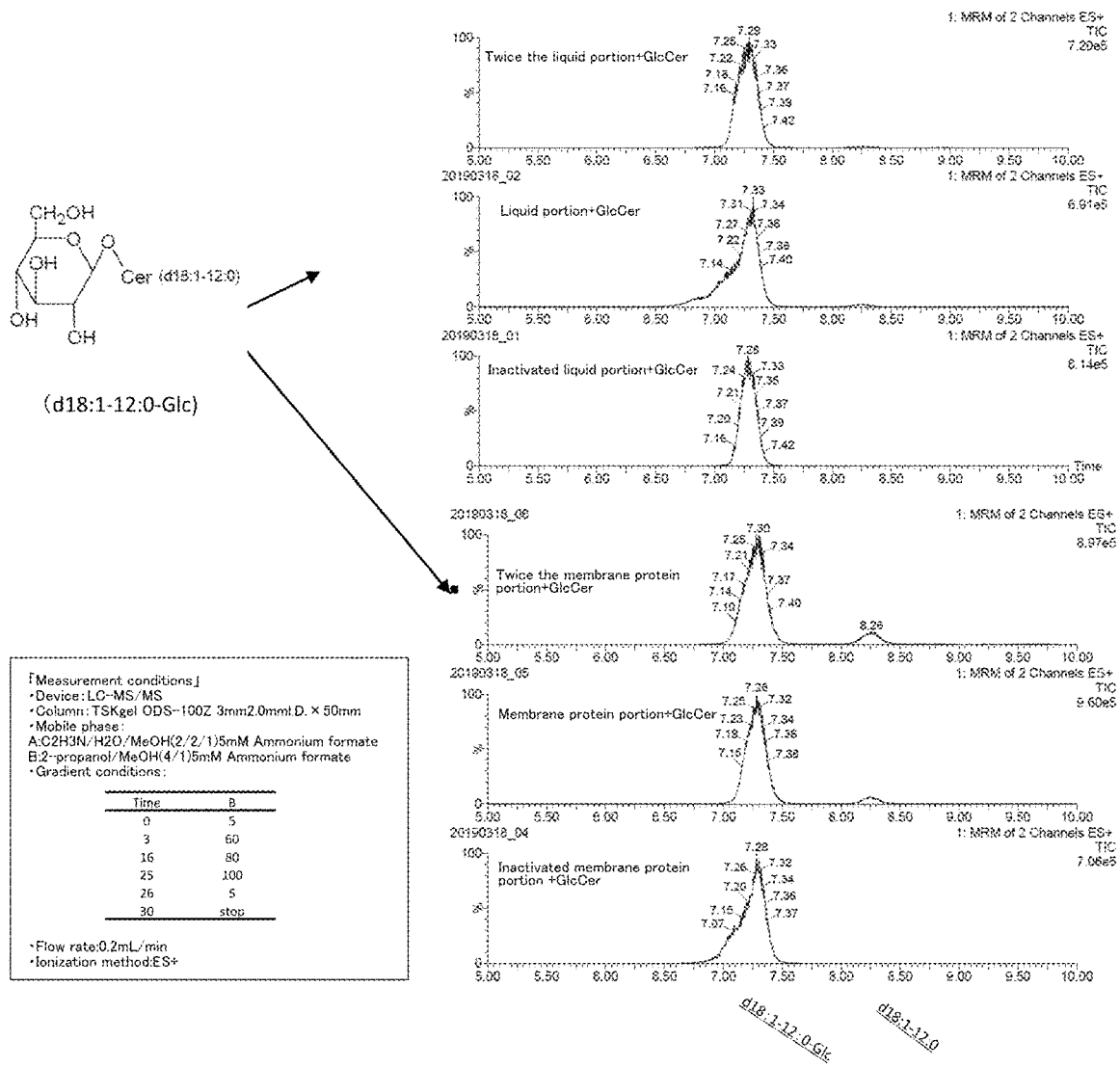
FIG. 2 shows the results of the detection of free ceramides produced when commercially available GlcCers are treated with an enoki digestion liquid (supernatant portion or membrane protein portion).

Commercially available GlcCers (C12-beta-glucosylceramide (d18:1-12:0-Glc)) were used as a reaction substrate, and subjected to an enzyme reaction at a pH of 5.0 and 37° C. for 1 hour with the supernatant portion or membrane protein portion of the enoki digestion liquid. An enoki digestion liquid that was subjected to an inactivation treatment at 100° C. for 5 minutes was used as a negative control. FIG. 2 shows the results in which the treatment solutions were subjected to LC-MS/MS analysis by setting d18:1-12:0-Glc or d8:1-12:0 as product ions. The figure on the left shows a chemical structure figure of the substrate (GlcCer), while the graphs on the right show the total ion chromatogram for each treatment solution. In all of the treatment solutions, d18:1-12:0-Glc was detected at an RT time of 7.3 minutes. Ceramide molecular species d18:1-12:0 that the self-digestion enoki did not possess was detected from samples other than the inactivated treatment solutions at 8.25 minutes. These results indicate that both the supernatant portion and the membrane protein portion of the enoki self-digestion liquid had an effect of digesting the glucosylceramides of the substrate to produce ceramides.

The invention claimed is:

1. A method for producing a free ceramide, comprising:
   homogenizing enoki mushrooms, beech mushrooms, king oyster mushrooms, or any combination thereof;
   separating the homogenate into a liquid portion and a solid portion;
   collecting the liquid portion as a mushroom self-digestion liquid;
   centrifuging the mushroom self-digestion liquid to obtain a supernatant and a pellet; and
   reacting the mushroom self-digestion liquid, the centrifuged supernatant, or the centrifuged pellet with a glycosyl inositol phospho ceramide (GIPC) or glycosylceramide, wherein enoki mushrooms are also known as enokitake and have the scientific name *Flammulina velutipes*, beech mushrooms are also known as shimeji and have the scientific name *Lyophyllum shimeji*, and king oyster mushrooms are also known as eryngii and have the scientific name *Pleurotus eryngii*.

2. The method according to claim 1, wherein the glycosyl inositol phospho ceramide is a plant-derived glycosyl inositol phospho ceramide.

3. The method according to claim 1, wherein the glycosyl inositol phospho ceramide is represented by formula (1):

$$R\text{-GlcA-Ins-P-Cer} \tag{1}$$

wherein GlcA represents a glucuronic acid, Ins-P-Cer represents an inositol phospho ceramide, and R represents a monosaccharide or disaccharide.

4. The method according to claim 3, wherein the glycosyl inositol phospho ceramide represented by formula (1) is at least one member selected from the group consisting of H-GIPC, N-GIPC, NAc-GIPC, HN-GIPC, and HNAc-GIPC:

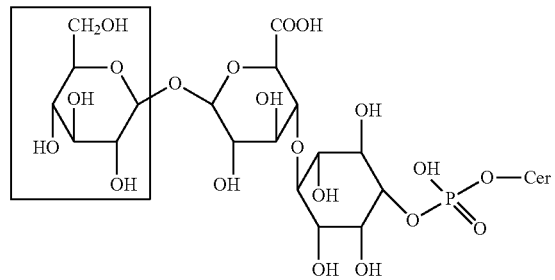

(H-GIPC: with a proviso that a glucose residue surrounded by a square frame may be a mannose residue or a galactose residue)

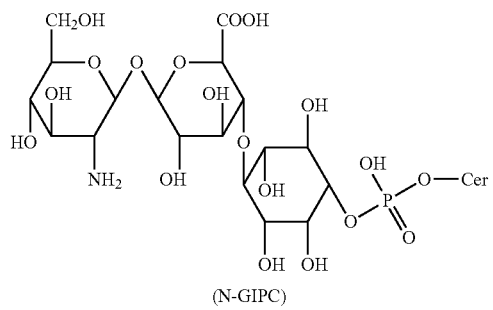

(N-GIPC)

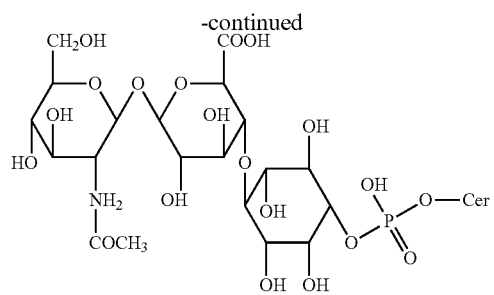

(NAc-GIPC)

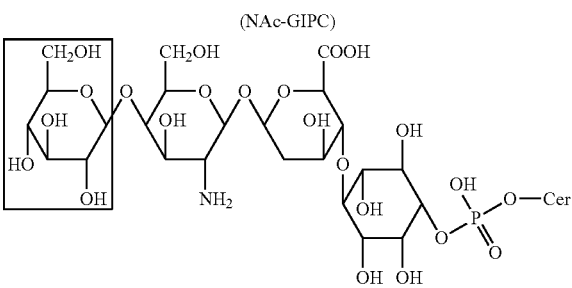

(HN-GIPC: with a proviso that a glucose residue surrounded by a square frame may be a mannose residue or a galactose residue)

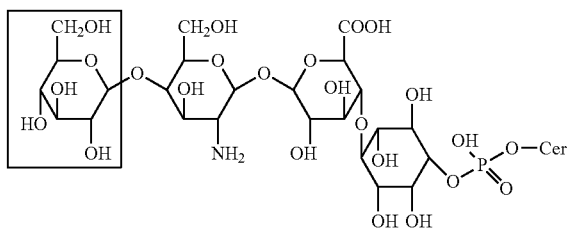

(HNAc-GIPC: with a proviso that a glucose residue surrounded by a square frame may be a mannose residue or a galactose residue).

5. The method according to claim 1, wherein a ceramide skeleton of the glycosyl inositol phospho ceramide or glucosylceramide is a combination of a sphingoid base containing 2 or 3 hydroxyl groups, 18 or 20 carbons atoms, and 0, 1, or 2 carbon-carbon double bonds and a fatty acid containing 12 to 26 carbon atoms, 0 or 1 carbon-carbon double bond, and 0, 1, or 2 hydroxyl groups.

6. The method according to claim 1, wherein the glycosyl inositol phospho ceramide or the glycosylceramide are originally present in the mushroom self-digestion liquid.

* * * * *